United States Patent

[11] 3,601,654

[72] Inventors Brian H. Long
Orange;
Oliver T. Tetirick, Orange; Richard W. Erickson, Santa Ana, all of, Calif.

[21] Appl. No. 48,391
[22] Filed June 22, 1970
[45] Patented Aug. 24, 1971
[73] Assignee Certron Corporation
Anaheim, Calif.

[54] ELECTROSTATIC-FREE TAPE CASSETTE
10 Claims, 5 Drawing Figs.

[52] U.S. Cl. .......... 317/2 R
[51] Int. Cl. .......... H05f 3/00
[50] Field of Search .......... 317/2 R, 2 A, 2 C

[56] References Cited

UNITED STATES PATENTS

| | | | |
|---|---|---|---|
| 1,530,704 | 3/1925 | Thomson | 317/2 R |
| 1,728,304 | 9/1929 | Pfannenstiehl | 317/28 X |
| 1,848,871 | 3/1932 | Corlett et al. | 317/2 R |
| 2,576,882 | 11/1951 | Koole et al. | 317/2 R |
| 2,778,635 | 1/1957 | Eash | 317/2 R |
| 3,159,718 | 12/1964 | Richardson | 317/2 R |
| 3,502,284 | 3/1970 | Loewenberg et al. | 317/2 R |

*Primary Examiner*—Lee T. Hix
*Attorney*—Lindenberg, Freilich and Wasserman

ABSTRACT: A standard tape cartridge of the coplanar twin hub-type, commonly referred to as a cassette, is rendered free of static electricity on the tape being transported from one hub to the other by a conductor, such as a conductive band of resilient material or conductive friction pins, in contact with the front (coated side) of the tape and electrically connected to conductive guide elements in contact with the back of the tape. The conductive band is provided as a V, U or O-shaped spring in contact with a conductive pin spaced some distance from the center of each coil, or in the form of a leaf spring wrapped around friction pins at front corners of the cassette and arched to continually make contact with the back of the tape on the coils.

BRIAN H. LONG
OLIVER T. TETIRICK
RICHARD W. ERICKSON
INVENTOR.

BY Lindenberg, Freilich & Wasserman
ATTORNEYS

BRIAN H. LONG
OLIVER T. TETIRICK
RICHARD W. ERICKSON
INVENTOR.

BY
Lindenberg, Freilich & Wasserman
ATTORNEYS

ELECTROSTATIC-FREE TAPE CASSETTE

BACKGROUND OF THE INVENTION

The present invention relates to an improvement in a cartridge of the coplanar twin hub-type commonly referred to as a cassette.

Tape cassettes have been developed, standardized and widely used in the audio field, and are now coming into widespread use in the digital computer field. In the audio field, tape speeds are generally either 1⅞or 3½inches per second (ips) but in the computer field, tape speeds are expected to range from 1⅞to 24 ips, with an average of about 5 ips.

The higher speeds expected in the computer field result from demands of the data processing systems. To be competitive with paper tape data storage, tape cassettes must provide data at a rate of 1000 to 8000 bits per second (bps). Since the bit rate is a function of not only bit packing density but also tape speed, and computers are capable of reading at 100,000 to one million bits, or more per second, it is reasonable to expect that even higher tape speeds will be demanded in the computer field after maximum bit packing densities have been achieved in order to increase the bit rate in reading tapes.

A problem which as been observed in the operation of tape cassettes is the generation of static electricity. When two materials in steady contact are separated, a static charge occurs on the surface previously in contact. This phenomenon is most apparent when the materials are poor conductors that hold the charge longer. Thus, when tape is pulled from one coil, the inside (back) surface of the outer convolution is separated from the outside (coated) surface of the next convolution to generate static electricity in an erratic pattern.

This charge on the inside of the tape would cancel the opposite charge on the outside of the tape, as the tape is wound on the takeup coil, if the diameter of the takeup coil were always the same as the supply coil so that the erratic charge on the inside would always match the opposite charge on the outside. Since that condition is only momentarily satisfied at the midpoint of the tape, there is almost always a pattern of static charge remaining on the tape after it is wound on the takeup coil.

Any static electricity on the tape will create problems. Besides causing the tape to stick, thereby causing uneven drive past magnetic transducers, and possibly lead to blocking, it will cause dust particles to be attracted to the tape. Those particles then interfere with proper operation of the transducers, and cause excessive wear of the transducers. In extreme cases, the static electricity may even cause improper winding of the tape on the takeup coil. If a convolution of the tape is merely folded on the takeup coil as tape speed or direction is changed, it may not have any effect until the tape is played back in the opposite direction. However, in more severe cases of improper winding, the tape may become so entangled as to require disassembly of the cassette to correct the problem.

The phenomenon of generated static electricity is believed to be proportional to the speed at which the surfaces of the two materials are separated for a given atmospheric condition. Accordingly, the problem is more critical in the digital computer field than in the audio field. However, even in the audio field, it would be desirable to provide for continual discharge of static electricity as the tape is transported back and forth from one hub to the other.

SUMMARY OF THE INVENTION

Means is provided for discharging static electricity continually in a tape cartridge of the type having two hubs supported between mating halves of a case. The case is adapted to be inserted into a tape transport mechanism that pulls tape from a coil on one hub past a read-playback aperture, and winds the tape thus pulled on the second hub. The means for discharging static electricity on the tape is provided in the case as a low impedance conductive path from a conductive element in continual contact with the back of the tape to a conductive element in continual contact with the front of the tape.

In preferred embodiments, the conductive elements on each side of the tape may be friction pins electrically connected together, preferably through a metal or a metallized plastic case or at least one conductive friction pin on the inside of the tape and a V, U or O-shaped conductive spring in contact with the outside of the tape and the conductive friction pin. This spring is placed between the two hubs such that sides of the spring are in continual contact with the outside of the tape wound around the hubs. The friction pin is preferably connected to the conductive spring through a metal or metallized plastic case.

Still another embodiment employs a band of flexible conductive material attached at each end to friction pins at front corners of the case and so arched toward the hubs as to be in continual contact with the outside of the tape wound around the hubs. When the friction pins are formed from the same plastic material as the case, and the case is not metallized (coated with a film of metal), the friction pins are effectively made conductive by wrapping the band of conductive material around them on at least the side in contact with the tape.

The novel features that are considered characteristic of this invention are set forth with particularity in the appended claims. The invention will best be understood from the following description when read in connection with the accompanying drawings.

DETAILED DESCRIPTION OF THE DRAWINGS

Figure 1:
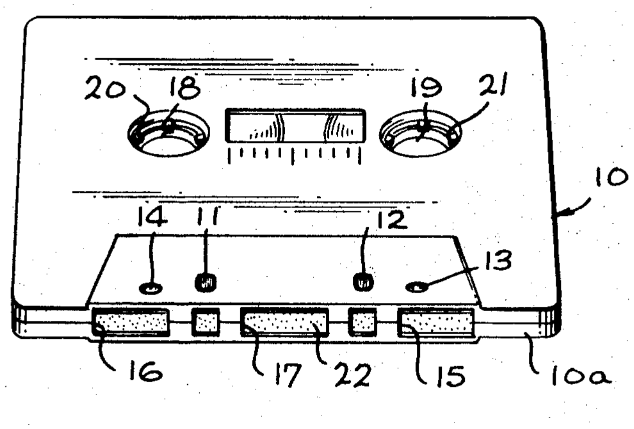
FIG. 1 is a perspective view of a standard cassette in which the present invention is embodied.

Referring now to FIG. 1, a standard cassette 10 shown in a perspective view from the front (apertured) end which is adapted to be so inserted into a tape transport mechanism as to receive a capstan, pressure roller, magnetic heads, hub drive shafts, and centering pins. Apertures 11 and 12 receive the centering pins which protrude from a baseplate to a drive mechanism (not shown), and an aperture 13 receives a capstan to pull tape across the front end of the case 10 from left to right. Once all of the tapes has been transferred from a hub on the left to a hub on the right, the case may be turned over to place the capstan of the transport mechanism in a aperture 14. Recording or playback then proceeds on a second track. Alternatively, two capstans may be provided, the second one passing through the aperture 14 to selectively drive the tape in either direction. The magnetic heads are then either duplicated or indexed to record and playback on one of two tracks, or pairs of tracks, depending upon the direction the tape is being transported.

In a tape transport mechanism for the digital computer field, indexing may be provided for selectively recording on more than two tracks. Because the transport mechanisms that are being developed to operate with the standard cassette of FIG. 1 vary in operating characteristics, reference will hereafter be made to only tape transport mechanisms for the audio field, and more particularly to a standard mechanism of the type which requires the cassette to be turned over to select the second of two tracks or pairs of tracks.

Front apertures 15 and 16 are provided in the case 10 to receive a pressure roller and an erase head, respectively, while the first side of the tape is being used, and vice versa while the second side is being used. An aperture 17 receives a magnetic head to record and playback on one track or pair of tracks along the bottom half of the tape. Thus, by turning the cassette over, the same head may be used for the second track. This arrangement is also provided for the erase head.

Large apertures 18 and 19 through the side of each half of the case 10 capture hubs 20 and 21 having sprockets. Drive shafts with tabs protrude from the baseplate of the drive mechanism and pass through the apertures 18 and 19 in such a manner as to engage the sprockets on the hubs with the tabs to wind tape 22 on the hubs. For example, as a capstan passing through the aperture 13 pulls tape from the hub 20, the drive shaft passing through the aperture 18 is disengaged by the drive mechanism so that it turns freely, or with a minimum of friction. The drive shaft passing through the aperture 19, on the other hand, is turned by the drive mechanism through a slip clutch to wind tape on the hub 21. The clutch is designed to maintain desired tension on the tape between the capstan 13 and the hub 21 as it is being wound.

Some cassettes being made for the digital field are made of metal, such as die-cast aluminum, but most are made of plastic. To assure that the hubs are always centered on the apertures 18 and 19, and to reduce friction for greater tape speeds, ball bearing have reportedly been used for the hubs in some cassettes. Although additional measures have been taken to reduce friction and vibration in an effort to improve performance at present audio tape speeds, and to increase tape speeds for the digital computer field significantly above 5 ips to at least 24 ips, no measures have heretofore been taken to discharge static electricity on the tape.

Figure 2:
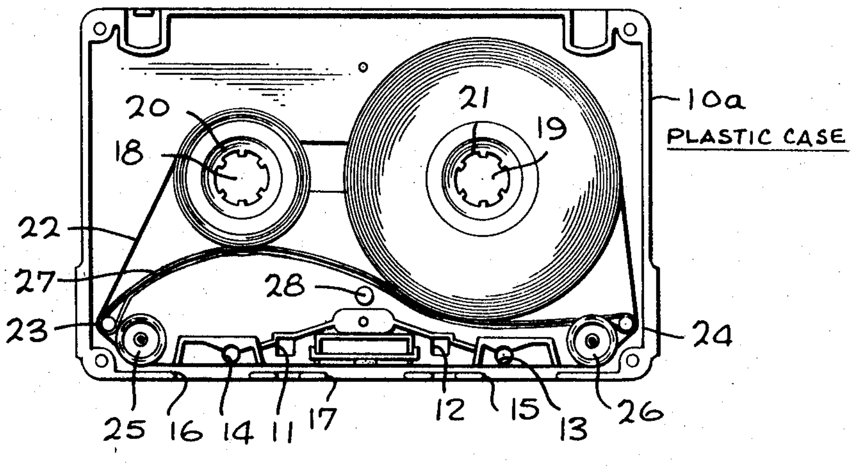
FIGS. 2 to 5 are plan views of the cassette of FIG. 1 with the top half of the case removed to show various embodiments of the present invention.

FIG. 2 illustrates one embodiment of the present invention for a standard plastic case. For convenience, parts common to those parts shown in FIG. 1 will be referred to in FIG. 2, and the remaining FIGS. 3 to 5, by the same reference numerals. In each of these FIGS. 2 to 5 only one-half of the case is shown and identified by reference numeral 10*a*. The other mating half (not shown) is complementary.

The tape 22 is guided from the hub 20 to the hub 21 by conductive friction pins 23 and 24, and by pulleys 25 and 26. As the tape is pulled from the coil on the hub 20, the fast parting of the back (polyester film) surface from the front (magnetic film) surface will cause erratic static electricity to be generated with the front of the tape charged opposite the back. The static electricity thus generated is imperfectly discharged as the coil is wound on the hub 21 because a given area on the back of the tape will not be rewound on the same area on the front of the tape from which it was separated owing to the ever changing diameters of the coils on the hubs 20 and 21.

To discharge the static electricity, according to this first embodiment of the present invention, a band 27 of resilient and conductive material of a length greater than the distance between the friction pins 23 and 24 is connected between those pins, and arched in the direction of the hubs. The friction pins extend from one-half of the case to the other in a position perpendicular to the tape guiding surfaces of the two halves.

Friction pins near guide pulleys are usually provided to keep the tape being wound under a certain tension. This tension is particularly desirable while operating the tape drive mechanism in "fast forward" and "fast rewind" modes. Here the are being used for the additional purpose of providing a continual electrical contact with the back of the tape.

The friction pins 23 and 24 are in electrical contact with the back surface of the tape to continually short any static charge on that surface to a static charge of opposite polarity on the front surface of the tape. That is done through the arched conductive band 27 in contact with the front of the tape on at least one coil at all times. The direction of the arch toward the coils is assured by a pin 28 which may be molded to full length on one-half of the case or only half length on each half of the case.

If the pins 23 and 24 are formed separately of metal, or cast with the case out of metal, or out of plastic and then coated with metal, the band 27 may be attached to the pins in any convenient manner, as by soldering or inserting the ends in slots. The band itself may be made from a thin foil of metal, such as copper or aluminum, but is preferably made from polyester film coated with aluminum on both sides.

If the pins 23 and 24 are not made of conductive material, such as when cast as integral part of a plastic case that is not metallized, the pins 23 and 24 may be effectively made conductive by using a double length of the band 27 to form a collapsed loop around both pins. The inside surfaces of the collapsed loop are then cemented together, as with rubber cement, thus providing a conductive band which passes between the tape and the pins to provide conductive function pins in contact with the back of the tape, as shown.

Figure 3:
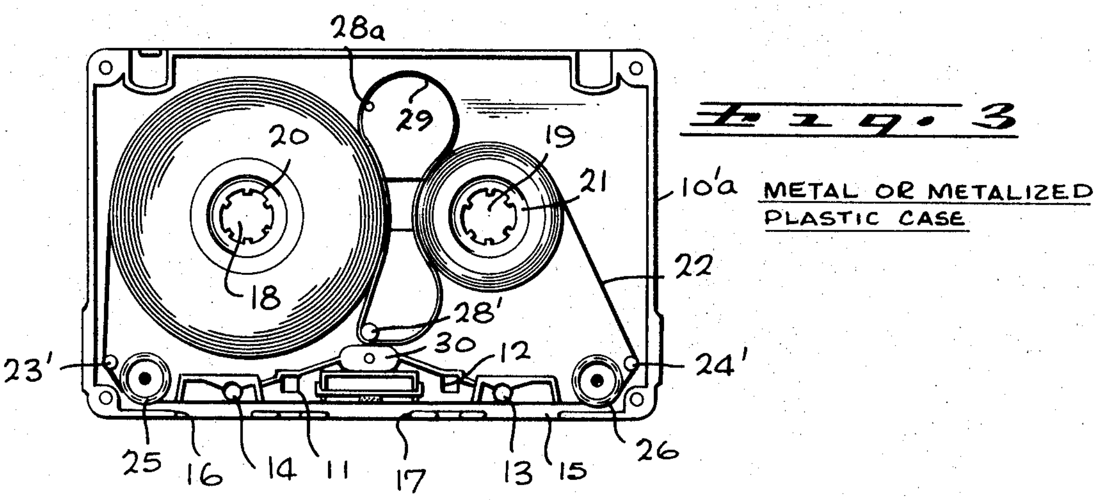

Referring now to FIG. 3, a second embodiment of the present invention comprises a metal or metallized plastic case 10*a'* with an O-shaped spring 29 of suitable conductive material, such as copper or aluminum, or a polyester film coated with aluminum on at least the outside surface, and of sufficient size to assure that the outside surface will bear against both coils of the tape. The bottom of the O-shaped spring is trapped between a conductive pin 28' and a backing element 30 provided immediately behind the center aperture 17. That backing element may also serve as a major point for securing the two halves of the cassette; the other major points are the four corners. Holes for self-tapping screws are shown at the major points. As tape is transported from the hub 20 to the hub 21, the O-shaped spring will adjust to the left while continuing to make contact with the front of the tape on the outer convolutions of coils around both hubs 20 and 21.

The coils of tape are always turning in opposite directions. Accordingly, while the friction of one tends to drive the O-shaped spring up, the friction of the other tends to drive the O-shaped spring down so that it maintains a position between the two coils. However, when the larger coil around the hub 20 is turning clockwise, or when the coil around the hub 21 is larger and turning counterclockwise, the friction of the larger coil may tend to drive the O-shaped spring down from between the coils. To assure that will not happen, the O-shaped spring is looped around a pin 28*a* half of which is normally cast on each half of the case.

The static charge on the front of the tape is continually discharged to the back of the tape through the O-shaped spring 29, the pin 28', backing element 30 and the friction pins 23' and 24'. This, of course, assumes the case is cast from metal, or if cast from plastic, that it is coated with metal, so that the elements just enumerated are electrically connected by the sidewalls of the case. If not, the backing element 30 and pin 28' may be electrically connected to the friction pins 23' and 24' through a separate conductor in the form of a deposited film or wire, and all of the elements thus connected must be conductive, or rendered conductive by some metal coating.

Figure 4:
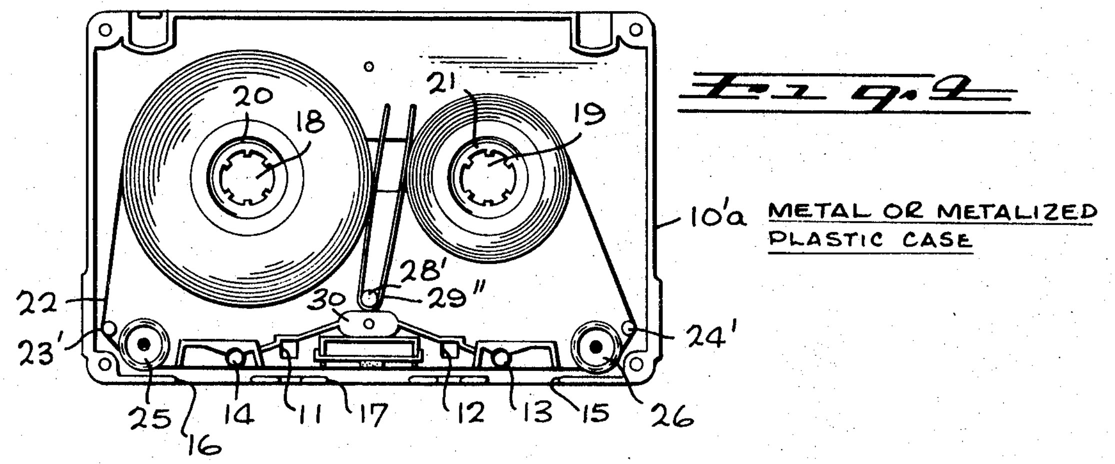

A variation of the second embodiment is shown in FIG. 4. It comprises a U-shaped spring 29'' which will pivot around the pin 28' as tape is transported from one hub to the other. In practice, the bottom of the U-shaped spring may be widened to provide a shape for the spring in the form of a square U, or narrowed to a V shape. However, since the principal is the same for all of these shapes, they are all properly referred to generically as U-shaped springs.

As in the embodiment of FIG. 3, the spring connects the front surface of the tape 22 to the metal of the case 10*a'* while conductive posts 23' and 24' are continually in contact with the back of the tape to provide a direct discharge path for static electricity. The metal of the case will provide a direct current path from one side of the tape to the other, but usually the case will be grounded through the tape transport mechanism so that each side of the tape is discharged directly to ground. However, that is not essential, nor is it essential that the case be made of metal, or be coated with metal if made of plastic. It would be sufficient for the backing element 30 and pins 23', 24' and 28' to be connected together electrically by some means, as for the embodiment of FIG. 3.

Figure 5:
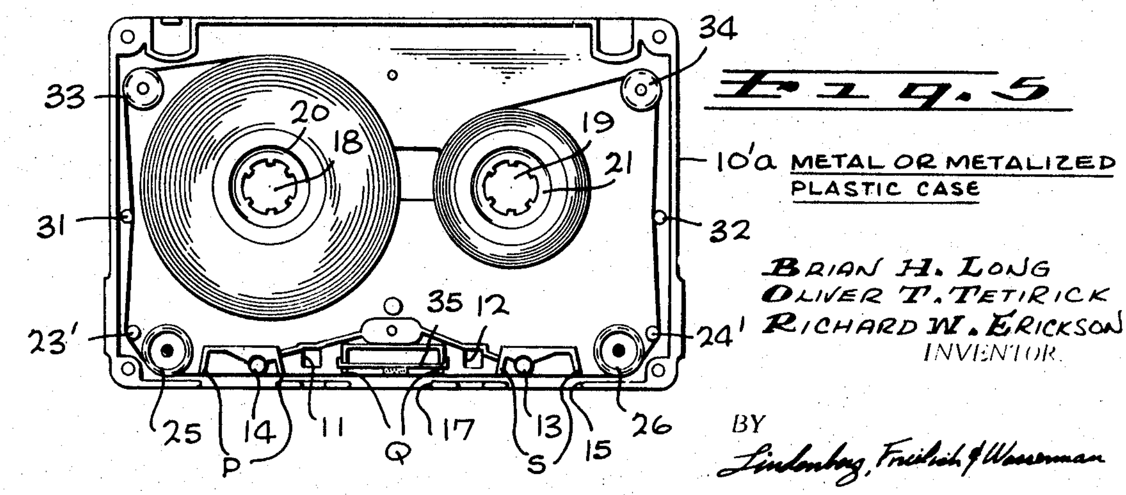

FIG. 5 illustrates still another embodiment comprising a case 10*a'* made of metal, or metallized plastic, to provide conductive friction pins 31 and 32, in addition to friction pins 23' and 24'. Additional pulleys 33 and 34 are provided to define constant paths for tape to or from conductive friction pins 23' and 24'. In other words, the pulleys 33 and 34 assure that the tape path to the pins 23' and 24' will remain the same at all times as tape is transferred from one hub to the other. That path would be a straight line between the pins 23' and 24' and the respective pulleys 33 and 34, but for the additional friction pins 31 and 32 which deflect the tape in a direction toward a line connecting the centers of the pulleys and friction pins that otherwise define the path. That assures constant contact of both sides of the tape on each side of the case with a conductive pin to discharge static electricity.

As in the embodiments of FIGS. 3 and 4, it is not essential that the case be made of metal, or be plated with metal. It would be sufficient if the friction pins would be made conductive, as by metal sleeves, for example, as long as some means is provided for electrically connecting the pin 31 to the pin 23', and the pin 32 to the pin 24'.

In each of the embodiments of FIG. 3, 4 and 5, the back of the tape is continually in contact with pins on each side of the aperture 17, and with guides on each side of the apertures 13 and 14, as shown by the pins P, Q and S in FIG. 5. The pins Q also serve to hold in place a leaf spring 35 for a pressure pad. If the case is metal, or metallized plastic, the friction pins 23' and 24' may be omitted since the pins P, Q and S will provide an electrical contact to the back of the tape. It would be some of advantage to do so in cassettes for the digital computer field when positive drive is continually provided to both hubs with sufficient speed differential to maintain the desired range of tape tension. In the embodiment of FIG. 5, the friction pins 23' and 24' may be omitted, and the loss of friction made up by placing the friction pins 31 and 32 closer to the pulleys 33 and 34.

Although particular embodiments of the invention have been described and illustrated, it is recognized that modifications and variations may readily occur to those skilled in the art. Consequently, it is intended that the claims be interpreted to cover such modifications and variations.

What is claimed is:

1. In a standard magnetic tape cartridge of the type having two coplanar hubs supported for independent rotation in a case having means for defining a tape path from a coil around one hub past apertures along an end wall of said case to a coil around the other hub, said path defining means including at least one pin against which one side of the tape is continually in contact, the improvement comprising means for rendering said pin conductive on at least that portion of its outer surface in contact with said tape;

contact means for continually maintaining an electrical contact with the other side of said tape opposite said one side; and means for providing a low impedance current path between the conductive part of said pin and said contact means.

2. The improvement as defined in claim 1 having two pins in said path defining means at opposite ends of said end wall, and means for rendering the second pin conductive on at least that portion of its outer surface in contact with said tape, and wherein said contact means comprises a conductive band of resilient material supported as a leaf spring between said two pins, said band being sufficiently longer than a straight line distance between said two pins and arched in a direction toward said two coils of tape with a portion of said band bearing at all times against said other side of said tape on the outside of at least one of said coils of tape.

3. The improvement as defined in claim 2 wherein said means for rendering each of said two pins conductive comprises said material of said conductive band wrapped around each of said two pins through at least that portion in contact with said tape.

4. The improvement as defined in claim 3 wherein said resilient material of said conductive band comprises a double length of polyester film coated with a thin film of conductive material on at least one side and looped once around both of said two pins with the thin film of conductive material on the outside, and adhesive means for cementing together the inside surfaces of the polyester film loop between said two pins.

5. The improvement as defined in claim 1 wherein said contact means comprises a spring made of conductive resilient material supported in said case in a position between said coils of tape to bear at all times against said other side of said tape on the outside of both of said two coils of tape.

6. The improvement of claim 5 wherein said spring is U-shaped and is supported with its two arms extending between said coils, each arm bearing against said other side of said tape on the outside of a different one of said two coils and wherein said spring is held in place by a holding pin secured to said case in a position between said two arms, said holding pin being in contact with the inside of said spring between said two arms, and a backing element secured to said case in a position close to said holding pin, said element having a surface against which the outside surface of said spring between said two arms may bear, whereby the position of that portion of said spring between said two arms will adjust as tape is transferred from one hub to the other.

7. The improvement of claim 6 wherein said spring is O-shaped and supported between said two hubs by a holding pin secured to said case in a position offset from a line between said two hubs with sides of said O-shaped spring in contact with both of said two coils, said holding pin being in contact with the inside of said O-shaped spring, and a backing element secured to said case in a position close to said holding pin, said element having a surface against which the outside surface of said O-shaped spring may bear, whereby the position of said O-shaped spring will adjust as tape is transferred from one hub to the other.

8. The improvement of claim 7 including a retaining pin parallel to said holding pin secured to said case in a position offset from a line between said two hubs in a direction opposite the offset of said holding pin, said position being inside said O-shaped spring.

9. The improvement as defined in claim 1 wherein said tape path defining means comprises at least one pulley secured to said case, said one pulley being secured in a position on one side of said one pin remote from said apertured end wall to guide tape passing over said given pin to and from a coil of tape on a hub, said one pulley and said one side against which said one pin is in contact being on the outside of said two coils with some deflection of said given path at said one pin, and said contact means comprises at least one other pin secured to said case and means for rendering said other pin conductive.

10. In combination:

a tape cartridge case having apertures along an end wall thereof;

two hubs supported by said case for rotation in common plane within said case;

a supply of tape having two opposing flat surfaces and two ends, one end secured to each of said two hubs, said tape being wound in a coil around at least one of said two hubs with one flat surface of said tape in a given turn of a coil overlaying the opposing flat surface of said tape in a preceding turn of the same coil;

means secured to said case for defining a tape path for reversibly transferring tape past said apertures along said end wall of said case from one coil around one of said two hubs to a second coil around the other of said two hubs;

first conductive means within said case secured to said case and in continual contact with one of said two flat surfaces of said tape in said path between said two coils for conducting electrical current;

second conductive means within said case and in continual contact with the other of said two flat surfaces of said tape for conducting electrical current; and means for providing electrical continuity between said first and second conductive means, whereby any static change produced on said two surfaces of said tape upon transferring tape from a coil around one of said two hubs to a coil around the other of said two hubs is discharged.